Figure 1:
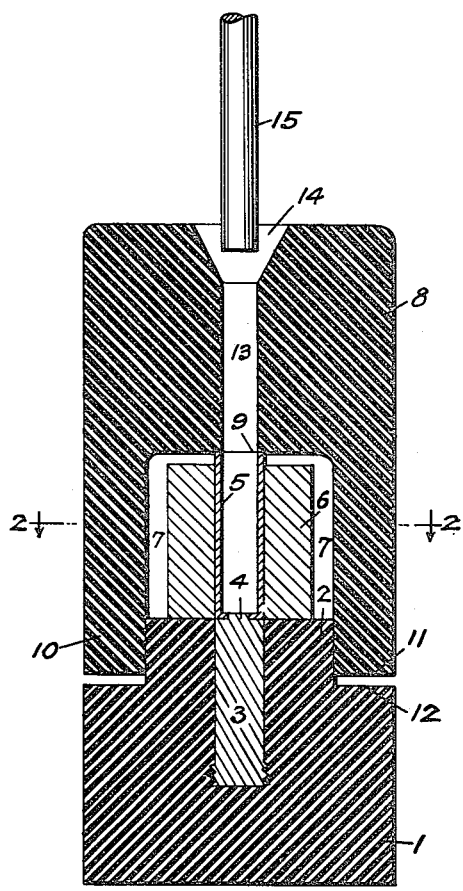

Sept. 12, 1944.  H. B. YOUNG ET AL  2,357,863

LOADING SUPPORT FOR PRIMER CUPS

Filed July 29, 1942

Inventors
Herbert B. Young
Andrew T. Anderson
Atwood H. Grover
By G. J. Fessenich J. H. Church
Attorneys Patented Sept. 12, 1944

2,357,863

UNITED STATES PATENT OFFICE 2,357,863

LOADING SUPPORT FOR PRIMER CUPS

Herbert B. Young, Kenvil, Andrew T. Anderson, Dover, and Atwood H. Grover, Rockaway, N. J.

Application July 29, 1942, Serial No. 452,784

4 Claims. (Cl. 86—20)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a loading support for loading primer-cups with primer composition. The support also may be used for filling other cup-shaped containers with powdered or compressible solid material.

Machines for loading primer cups have been developed wherein a sequence of loading operations are performed at a plurality of stations in the machine. The cups are indexed from station to station where the various operations are performed. Usually the cups are loaded by separately introducing increments of primer composition and consolidating each increment by applying pressure before the introduction of the next succeeding increment. Also, wadding, waterproof sealing composition and the like are applied to the ends of the cup to protect the explosive composition contained therein. These operations are carried out at the several stations above-mentioned.

The primer cups usually employed are formed of thin metal or paper, and because of their light construction are unable to withstand the pressure applied for consolidation of the primer composition when the cup is unsupported. Moreover, due to the small size of the cups and to their long thin shape the indexing mechanism of a conventional loading machine is too ponderous to handle them satisfactorily.

Various forms of loading supports have heretofore been suggested for carrying primer cups through a processing machine. None of these has been entirely successful.

The loading support herein described has proven to be eminently satisfactory in actual operation.

An object of this invention is to provide an adapter for loading priming cups which is simple in construction and economical to manufacture. Preferably a minimum of metal is used in the construction thereby releasing quantities of such metal for more urgent needs. The bulk of the support is formed of a synthetic resinous composition, preferably a phenol-aldehyde resin, filled or not, as desired, with wood fiber, inorganic filler or the like. The resinous parts of the support are hot molded or die cast; if they were made of metal requiring machining, valuable machine tool hours would have to be diverted from more essential work to turn out these components. Therefore, the present invention provides a great saving in machine work. In addition, the entire external surface, and much of the internal surface of the support, is of synthetic resin which is free from the objectional characteristic of striking sparks against materials with which it comes in contact, resulting in minimizing the explosion hazard inherent in handling explosive materials.

Irrespective of the degree of care used in handling explosives, occasional accidents are bound to occur. Explosions in supports of the type described usually result in complete destruction of the device. The cheapness and ease of replacement of the support according to this invention makes it a substantial improvement over more expensive prior art supports composed entirely of metal.

The invention is a primer-cup loading support or the like comprising a base, a member supporting a primer cup resting upon said base and a cover having a channel communicating with said cup.

Figure 2:
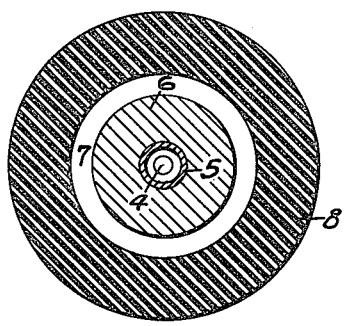

The invention will be more particularly described with reference to the accompanying drawing in which Figure 1 is a vertical sectional view of a preferred embodiment of the support, and Figure 2 is a sectional view taken along the line 2—2 of Figure 1.

In the drawing, 1 is a synthetic resinous base including an upstanding cylindrical pedestal 2. A metal anvil 3, preferably of steel, is imbedded in the base and its upper end is provided with a small cylindrical boss 4 extending into the lower opening of a primer-cup 5. Alternatively, the base and pedestal may be made entirely of resinous composition, without a metallic anvil insert.

An annular metallic sleeve 6 rests upon the top of the pedestal and supports the side-walls of the primer-cup 5. The sleeve walls are made sufficiently thick adaquately to support the cup against pressure applied in consolidating the primer. The width of the sleeve is less than the width of the pedestal top to provide an annular clearance space 7 so that cover 8 may readily be assembled to the base without disturbing the position of the sleeve and primer-cup. Also the sleeve is shorter than the primer-cup which permits the upper end of the cup to protrude a short distance above the top of the sleeve. This is desirable so that a good fit may be obtained at 9 where the cover engages the top of the cup.

Cover 8 is made of a synthetic resinous composition, as is the base 1. The cover is cylindrical and has an outside diameter equal to the diameter of the base. It is provided with a depending skirt 10, frictionally engaging the side walls of pedestal 2 to provide a cavity containing the sleeve and primer-cup. The length of the skirt is such that the bottom 11 does not quite touch the shoulder 12, whereby, in placing the cover upon the base, it is stopped against the top of the primer-cup at 9 and a tight fit is obtained. The cover further is provided with axial channel 13 having an upper conical mouth 14. Increments of priming composition are introduced to the cup through this channel which also serves as a guideway for the consolidating tool 15.

In operation, a primer cup to be filled is inserted in the sleeve which is then set upon the base pedestal, the hole in the bottom of the cup engaging the boss 4 on the anvil whereby to center the assembly. The cover next is placed over the assembly and pressed down until it is engaged with the top of the primer-cup at 9. The sleeve containing the cup next is run through a primer loading machine. After processing, the cover is removed, the protruding upper end of the cup is crimped over to match the bottom end, and the loaded primer is pushed out of the sleeve by any suitable instrument.

We claim:

1. A loading support for a primer cup and the like, comprising a cylindrical base having an upstanding cylindrical platform of smaller radius than the radius of the base, an axial anvil exposed in the upper surface of said platform, a cylindrical sleeve for supporting a primer cup, and terminating below the upper end of said cup, said sleeve resting concentrically upon the platform and over said anvil, and a cylindrical cover adapted to engage the upper end of the cup and having a depending skirt engaging the sides of the platform and spaced from the base so as to permit intimate contact between the cover and the upper end of the primer cup, said cover having an axial channel communicating with the primer cup.

2. A loading support for a primer cup and the like, comprising a cylindrical metallic sleeve for snugly supporting the primer cup with the end of the cup extending above said sleeve, a base of frangible non-metallic material having a central platform of smaller area than the base, a metallic anvil centrally embedded in said frangible base and having a portion exposed in the center of the upper surface of the platform and aligned with the primer cup, and a cover of frangible non-metallic material adapted to engage the upper end of the cup and having a depending skirt engaging the sides of said platform and spaced from the base, so as to permit intimate contact between the cover and the upper end of the primer cup, said cover having an axial channel communicating with the primer cup.

3. A loading support for a primer cup and the like, comprising a metallic sleeve for snugly supporting a primer cup, a base of non-metallic frangible material having a central platform of smaller area than the base upon which said sleeve is concentrically supported, and a cover of material having the same characteristics as the base and having a depending skirt spaced from said sleeve and engaging the sides of the platform, said cover having an axial channel communicating with the cup.

4. The invention of claim 3 characterized in that the base and sleeve are formed of synthetic resinous material.

HERBERT B. YOUNG.
ANDREW T. ANDERSON.
ATWOOD H. GROVER.